(12) United States Patent
Henselmans et al.

(10) Patent No.: US 7,492,468 B2
(45) Date of Patent: Feb. 17, 2009

(54) FREE-FORM OPTICAL SURFACE MEASURING APPARATUS AND METHOD

(75) Inventors: Rens Henselmans, Eindhoven (NL); Petrus Carolus Johannes Nicolaas Rosielle, Veldhoven (NL)

(73) Assignee: Nederlandse Organisatie Voor Toegepast-Natuurwetenschappelijk, VK Delft (NL)

( * ) Notice: Subject to any disclaimer, the term of this patent is extended or adjusted under 35 U.S.C. 154(b) by 113 days.

(21) Appl. No.: 10/573,763

(22) PCT Filed: Sep. 29, 2004

(86) PCT No.: PCT/NL2004/000672

§ 371 (c)(1),
(2), (4) Date: Jun. 29, 2006

(87) PCT Pub. No.: WO2005/031255

PCT Pub. Date: Apr. 7, 2005

(65) Prior Publication Data

US 2006/0290942 A1    Dec. 28, 2006

(30) Foreign Application Priority Data

Sep. 29, 2003    (EP)    ............................. 03078094

(51) Int. Cl.
*G01B 11/02*    (2006.01)

(52) U.S. Cl. ...................................... 356/511; 356/508

(58) Field of Classification Search .................. 356/489, 356/495, 511–516, 123, 496, 498, 501, 508
See application file for complete search history.

(56) References Cited

U.S. PATENT DOCUMENTS 4,575,942 A * 3/1986 Moriyama .................... 33/1 M (Continued)

FOREIGN PATENT DOCUMENTS

EP    0 398 073    11/1990
EP    0 512 356    11/1992

*Primary Examiner*—Patrick J Connolly
*Assistant Examiner*—Scott M Richey
(74) *Attorney, Agent, or Firm*—Young & Thompson (57) ABSTRACT

A surface measuring apparatus for measuring a surface shape of an element includes a measurement frame having a mount for mounting the element to be measured, a stage including a rotatable device, the stage being movable in at least a first direction relative to the measurement frame, and a contactless distance measurement device for measuring in the first direction a distance between the measurement frame and a predetermined measurement surface provided on the rotatable device. The apparatus further comprises a second distance measurement device for measuring in a second direction a second distance between the device and a selected position on a surface of an element mounted relative to the measurement frame and a rotation measurement device for measuring an angle of rotation between the first and second direction. In this way, aspheric or free-form surfaces of optical elements can be measured easily in closed loop without introducing abbel-errors.

17 Claims, 4 Drawing Sheets

U.S. PATENT DOCUMENTS

| | | | |
|---|---|---|---|
| 5,640,270 A * | 6/1997 | Aziz et al. | 359/368 |
| 5,699,621 A * | 12/1997 | Trumper et al. | 33/1 M |
| 6,008,901 A * | 12/1999 | Ohtsuka | 356/489 |
| 6,721,056 B1 * | 4/2004 | Nakauchi et al. | 356/489 |
| 6,920,696 B2 * | 7/2005 | Sawada et al. | 33/1 M |
| 7,240,434 B2 * | 7/2007 | Lee et al. | 33/1 M |
| 7,307,708 B2 * | 12/2007 | Murata | 356/127 |
| 2005/0128468 A1 * | 6/2005 | Murata | 356/127 |
| 2005/0198844 A1 * | 9/2005 | Lee et al. | 33/1 M |

* cited by examiner

FREE-FORM OPTICAL SURFACE MEASURING APPARATUS AND METHOD

The invention relates to a surface measuring apparatus for measuring a position on a surface of an element to be mounted thereon, comprising: a measurement frame comprising a mount for mounting the element to be measured; a stage comprising a rotatable device, the stage being movable in at least a first direction relative to said measurement frame; and a contactless distance measurement device for measuring in said first direction a distance between said measurement frame and a predetermined measurement surface provided on said rotatable device.

In U.S. Pat. No. 6,008,901 surface shapes of for instance optical elements are measured by a position measurement device that is able to measure a contour using a reflection signal coming from the contour to be measured. However, for increasing dimensions and wilder inclinations of such contours to be measured, the reflection signals tend to be deflected in various directions. These reflection signals can then be no longer received by the measurement devices that are used, in particular, the interferometer beams are reflected away from the interferometric detection, so that a measurement signal is lost and the surface measurement is out of bounds.

Such aspheric elements are an example of elements that can be measured by the above referenced type of measurement apparatus. In particular, surface contour measurement has become a great issue since high-precision local shaping methods were developed in order to manufacture (aspheric or free-form) optical surface elements that theoretically greatly reduce the number of aberrations. As has become generally appreciated, these complex optical elements, when properly designed and manufactured, are able to greatly simplify complex (multiple) lens designs and at the same time maintain or even increase the performance characteristics of such designs when used for high precision optics.

U.S. Pat. No. 4,575,942 discloses a stage device with a rotatable device mounted thereon. It is however not used for surface measurement purposes.

EP512356 and EP398073 disclose a measurement device for measuring a surface. A measurement frame is provided with a movable stage thereon, the stage comprising a measuring device that can be shifted relative to the stage. This introduces the risks of undetected torsions, which could influence the reliability of the surface measurement.

The invention has as one of its objects to provide a measurement apparatus that is designed to be able to detect a surface contour of an element with "wilder" inclinations, wherein still form-measurement can be done with great accuracy up to un positional accuracy.

To this end, the invention provides an apparatus of the type mentioned in the preamble, comprising the features of the annexed claim 1. In particular, according to the invention, said predetermined measurement surface is formed by a surface of said rotatable device.

By providing a rotatable device, specifically, the invention allows a contour scanning distance sensor to be placed generally orthogonal to a surface to be measured, so that a reflecting measurement signal is not lost but can be adequately picked up by the sensor. Further, in particular, the invention has as a benefit, that it allows a direct measurement on the rotatable member itself. Through this, there are no positional errors introduced, for instance via a bearing that rotatably couples said rotatable member to said stage or via inaccuracies of the placement of the stage. The inventive apparatus therefore allows for an ultra fine nm precision measurement while maintaining flexible as regarding the inclinations in the surface contour to be measured. In this respect the apparatus further preferably comprises a second distance measurement device, for measuring in a second direction a second distance between said device and a selected position on a surface of an element mounted relative to said measurement frame; and a rotation measurement device for measuring an angle of rotation between said first and second direction. In addition, the apparatus may comprise a third distance measurement device for measuring in a third direction a third distance between said stage and said measurement frame.

Although such system can be calibrated with respect to a specific rotation angle of the rotatable device, so that the measurement surface need not be perfectly circular, preferably, said measurement surface is rotation invariant. By "rotation invariant" is meant that the measurement surface remains at least invariant under small discrete or continuous rotations. An example of rotation invariant surfaces are polyedric forms or circular forms. In this way, a distance measurement can be performed generally independent of the angle of rotation of the rotatable member.

Further, preferably, at least said first distance measurement device comprises an interferometer and said rotatable member is formed by a reflective member that has a perfect spherical or cylindrical shape over at least said measurement surface. An embodiment with a cylindrical shape effectively allows only a rotation over a single rotation axis, oriented preferably perpendicular to said first and second directions. A benefit of such a single rotation axis is that the degrees of freedom of the apparatus are constrained, eliminating the possible rise of positional errors etc. It however also restricts the possibilities to measure inclinations that are oriented in the direction of said rotational axis. To this end, in an embodiment where the rotatable member is rotatable through multiple axis, for instance, where the rotatable member comprises a perfectly spherical surface over at least a measurement surface area, also inclinations in different directions can be measured.

In a preferred embodiment, said reflective member is comprised in a housing provided on said stage, and wherein said reflective member is coupled directly to said second distance measurement device, said housing comprising a focusing member for focusing light from said first distance measurement device on said reflective member, so that a reflective light beam emanates virtually from the central axis of said reflective member. In this way, the reflection beam is reflected back to interferometer, so that the arrangement is generally insensitive to divergence due to a curved surface of the reflective member and lateral displacement thereof. Preferably, said focusing member is a cylindrical lens and said reflective member is cylindrical or alternatively, said focusing member is a spherical lens and said reflective member is spherical.

In one embodiment, said measurement frame comprises a reflective mirror, and wherein said stage comprises a beam splitting element, wherein a beam path of said first distance measurement interferometer travels directly between said reflective mirror, said beam splitting element and said reflective member, wherein said beam splitting element is coupled a light source, said beam splitting element further coupled to an interferometric light detector. This interferometric configuration allows a interferometric reference beam coupled directly to the measurement frame, so that the configuration is generally insensitive to displacements of said stage along the said beam path, when the positioning of the reflective member remains unmoved.

To allow more degrees of freedom in the above mentioned setup, in a practical embodiment, the said stage may be movable in two orthogonal directions and said stage comprises a third distance measurement device for measuring in a third direction a third distance between said stage and said measurement frame, said third direction being orthogonal to said first direction. Furthermore, preferably, the apparatus comprises a rotatable mount for mounting an element to be measured. In order to detect tilt of the element relative to said mount, said mount comprises a reference surface for allowing a measurement relative to said measurement frame.

In the setup of the invention, for wilder inclinations, the reflection beam may be divergently reflected, even if use is made from a relatively narrow beam. To preserve a sufficiently detectable reflected signal preferably said second distance measurement apparatus comprises an interferometer comprising an auto focus detector for focusing an interferometric beam of said interferometer on a selected position on said surface of said element. Such an auto focus feature is per se known from the above referenced-publication. However, preferably, said auto focus detector is provided with a focus distance measurement device in order to measure a focal distance from said auto-focus detector to said selected position on said surface of said element. In combination with said interferometric measurement beam, said focal distance measurement provides an absolute zero-level plane from which the interferometric measurement can be built up. The zero-level is established within a positioning accuracy of the auto focus detector, which may be in the order of a few tens of nm, wherein the variations relative to said zero-level are established with a positioning accuracy of the interferometer detector, which may be in the order of a few nm. It will be understood that such a focal distance measurement device may be used independent of the above mentioned surface contour measurement setup.

Furthermore, preferably, said second distance measurement interferometer may comprise a tilt detector for detecting a level of tilt of said element to be measured. Such a tilt detector is per se known from the above reference publication. Preferably, said tilt detector is arranged to detect a level of tilt of the element to be measured in a direction orthogonal to said first and second directions. Specifically, as explained in the afore going, said direction may generally correspond with an axis of rotation of the rotatable member. Smaller inclinations may thus be measured along this axis of rotation, while preserving the benefits of a single axis of rotation.

The rotation of said rotatable member may be provided independent of a measured contour surface, for instance in a feed forward loop. This is possible when the surface to be measured is not particularly wild and generally known in contour. In a preferred embodiment however, said tilt detector is coupled to said stage, so as to position said second distance measurement interferometer orthogonally to a measured contour of said element.

The invention further relates to a method for measuring a position of a device that is rotatable relative to a movable stage, comprising: providing a measurement frame; providing a predetermined measurement surface on said rotatable device; and measuring directly in a first direction a first distance between said measurement frame and said predetermined measurement surface provided on said rotatable device. Such a method provides an accurate positioning measurement of said device, generally independent of the angle of rotation and/or of positional errors of said stage.

The invention will further be illustrated with reference to the annexed drawings. In the drawing

Figure 1:
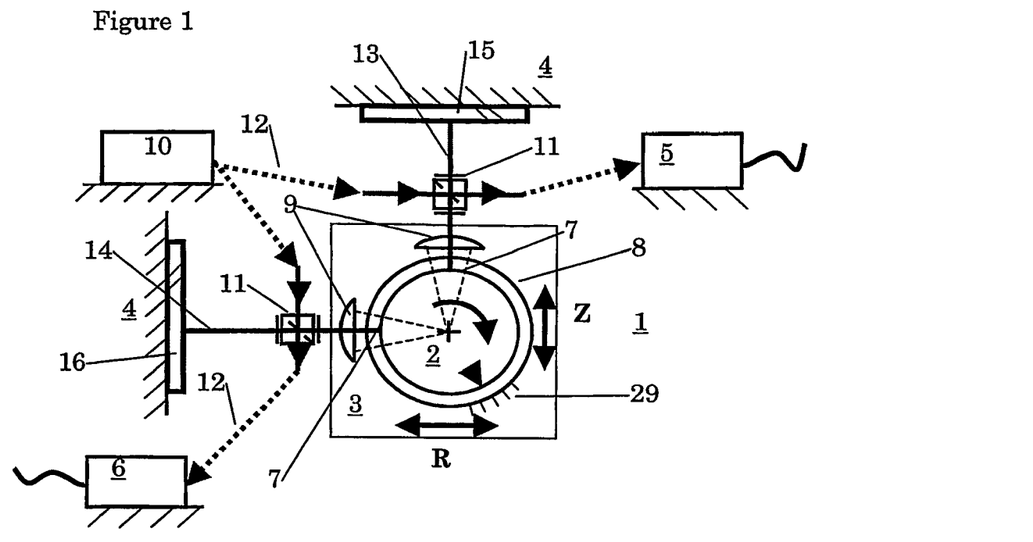
FIG. 1 shows a schematic partial view of an embodiment of the apparatus according to the invention.

In the drawings, the same or corresponding elements will be referenced with the same reference numerals. Turning to FIG. 1 there is depicted a schematic setup for a measuring apparatus 1 for measuring a position of a rotatable device 2 on a movable stage 3. In FIG. 1, the rotatable device may be any rotatable device, for example shaping tool or a work piece in a high precision manufacturing device, a calibration device for measuring machine accuracy, or the like. In the remainder, the description will be focusing towards measuring apparatus setups, wherein the rotatable device comprises a contour scanning distance sensor scanning the contour of an element to be measured; and a rotation measurement device for measuring an angle of rotation between said first and second direction. Such a setup will be further elaborated upon in FIG. 4 and FIG. 5 and may be used as a contour measurement apparatus.

The inventive apparatus 1 comprises a measurement frame 4. Such measurement frame 4 is considered a fixed outside world, and to this end is kept preferably as stationary as possible. Independent of said measurement frame 4, a stage 3 is movable relative to said measurement frame 4. On the stage 3 is provided a rotatable device 2, for instance, a contour scanning distance sensor. In FIG. 1 it is shown that the stage 3 is movable in two orthogonal directions (indicated by arrows R and Z). The precise guiding systems of the stage 3 are not shown but will be further illustrated with reference to the subsequent drawings. The apparatus comprises two independent distance measurement devices 5, 6 for measuring in a orthogonal directions an R-distance and Z-distance respectively, between said stage 3 and said measurement frame 4. The distance measurement devices 5, 6 are preferably heterodyne interferometers, but also other type of contactless distance meters may be used, for instance white light interferometers or absolute distance interferometers. FIG. 1 shows that the predetermined measurement surface, relative to which a distance measurement is performed, is a reflective measurement surface 7 of said rotatable member 2. In the form of rotatable contour scanning distance sensor, specifically, the invention allows the sensor 2 to be placed generally orthogonal to a surface to be measured, so that a reflecting measurement signal is not lost but can be adequately picked up by the contour scanning distance sensor 2. In particular, the invention allows a direct measurement on the rotatable sensor 2 itself. Through this, there are no positional errors introduced, for instance via a bearing 8 that rotatably couples said rotatable member 2 to said stage 3 or via inaccuracies of the placement of the stage 3. The inventive apparatus 1 therefore allows for an ultra fine nm precision measurement.

FIG. 1 further shows that the rotatable device 2 has a cylindrical form. In this setup, all movements are in a single plane, and rotations only occur with axis of rotation a direction perpendicular to said plane. Such a setup offers good placement accuracy and stability. Other forms, such as spherical forms, allow for rotations in other directions. Furthermore, with reference to FIG. 3, a regular polyedric form is discussed. The rotatable device 2 having reflective surface 7 is comprised in a (not shown) housing provided on said stage 3. Such housing provides a bearing 8, such as an air bearing or the like. For nm precise positioning measurement of the rotatable device 2 the reflective surface 7 forms a part fixed relative to said second device 2, for instance by forming an integral part with device 2. Furthermore, focusing members 9 are present for focusing light from said first distance measurement device on said reflective measurement surface 7, so that a reflective light beam emanates virtually from the central axis of said rotatable device 2. Such a light beam originates from a heterodyne laser arrangement 10, substantially producing light at two close by wavelengths as is well known in the art.

In the shown embodiment of FIG. 1, these focusing members 9 are cylindrical lenses, which together with the cylindrical reflective surface form a lens system that reflects a substantially parallel beam back to interferometric detector 5 and 6 respectively.

As depicted detector 5 is arranged to measure a relative distance in the Z-direction, wherein detector 6 is arranged to measure a relative distance in the R-direction.

Furthermore, by virtue of the presence of said focusing members 9, displacements of the reflective surface relatively lateral to said beam are cancelled and the position detection remains virtually insensitive to such displacements as should be. Although the light guiding system will be further explained with reference to FIG. 8, for the purpose of understanding FIG. 1 the apparatus according to the invention comprises an interferometric arrangement with beam splitting elements 11 that move together with the stage 3 along a line parallel to an R-axis or a Z-axis respectively. The beam splitting elements 11 are coupled to the laser 10 and to interferometric light detectors 5 and 6 respectively through a light guiding structure, schematically illustrated by dotted lines 12. In this way, beam paths 13, 14 of said interferometric arrangement travels between respectively reflective mirror 15, 16 forming a reference surface on said measurement frame 4, said respective beam splitting elements 11 and reflective measurement surface 7. It follows that in the embodiment depicted in FIG. 1, an interferometric arrangement for measuring a R-distance along beam 14 comprises laser 10, beam splitter 11, reflective reference mirror 16, reflective measurement surface 7 and interferometric detector 6. The interferometric arrangement for measuring a Z-distance along beam 13 between said measurement frame 4 and said reflective measurement surface 7 comprises laser 10, beam splitting element 11, reflective reference mirror 15, reflective measurement surface 7 and interferometric detector 5. Further particulars of this setup will be described with reference to FIG. 8.

Figure 2:
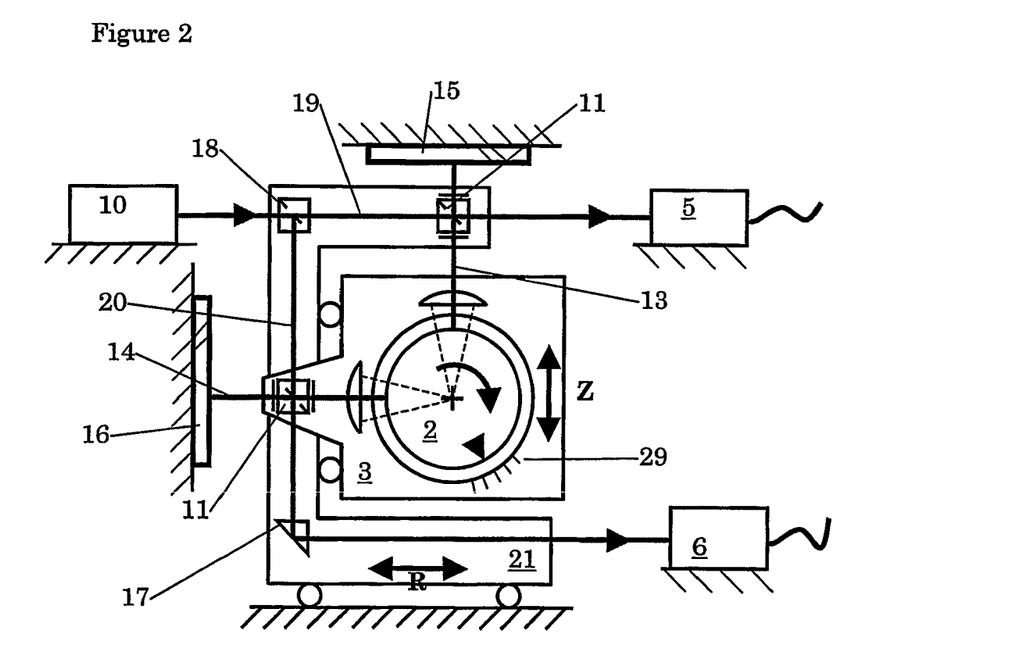
FIG. 2 shows a preferred embodiment having movable stage and a light guidance mounted on said stage.

In FIG. 1 the light guiding structures from the laser 10 via respective beam splitters 11, to the interferometric detectors 5 and 6, are only schematically illustrated by dotted lines 12. In FIG. 2 this is further elaborated in a preferred light guiding configuration, as well as particulars regarding a preferred actuation of the sage 3 become apparent. The light guiding configuration comprises a guiding mirror 17 and a (non polarizing) beam splitter 18 which distributes the light beam from laser 10 to the polarizing beam splitters 11 of respective R and Z (heterodyne) interferometric arrangements. This setup provides that the laser 10 and detector 5 and 6 respectively are well aligned along the R-axis and that the respective detectors 5 and 6 receive a signal independent of the R/Z position of the stage 3. In particular beam splitters 11 can move freely along an R-leg 19 and a Z-leg 20 of the laser beam respectively, parallel to the R-axis and Z-axis, while substantially maintaining their position in the laser beam. As will be explained with reference to FIG. 8, this movement introduces no detection error, since the detection is relatively independent of the distance of said splitters 11 to the reference mirrors 15 and 16 respectively. As to a preferred actuation of stage 3, stage 3 moves relative to a guiding stage 21 that is only movable in R-direction. Stage 3 moves in Z-direction relative to said guiding stage 21. Said guiding stage 21 contains a light guiding arrangement in the form of splitter 18 and guiding mirror 17. In the R-leg 19, beam splitter 11 is positioned on said guiding stage 21 to split the laser beam from the R-leg towards the beam path 13. In the Z-leg 20, beam splitter 11 is positioned on stage 3 and moves along the Z-leg 20, while splitting the light from the Z-leg towards beam path 14. Since only use is made of splitting mirrors and guiding mirrors unlimited numbers, high accuracy can be maintained.

Figure 3:
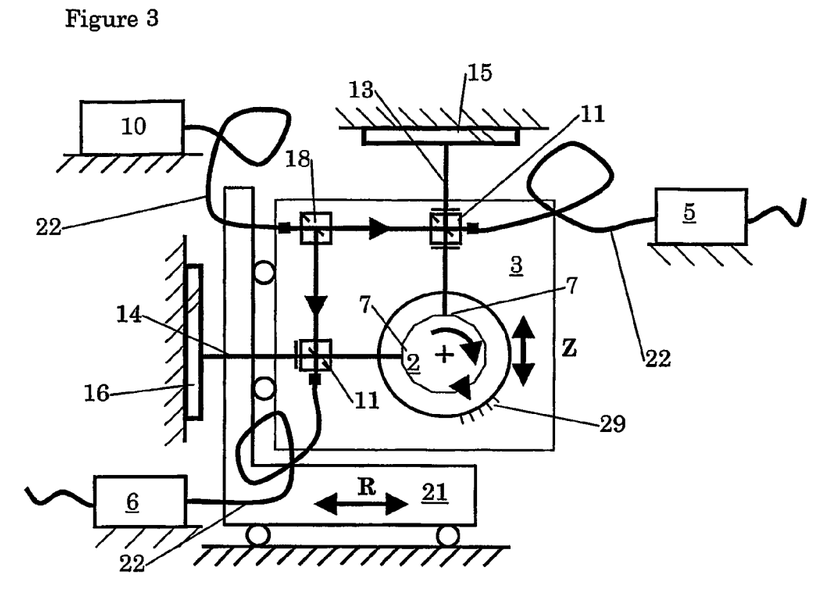
FIG. 3 shows an alternative embodiment of the apparatus according to the invention.

FIG. 3 shows an alternative embodiment of the invention. Here, in relation to the embodiment of FIG. 2, basically more freedom is allowed in the light guidance design, by use of flexible light guides in the form of fibers 22. These fibers 22 allow the laser 10 and detectors 6 and 6 placed on positions relatively independent of the stage-movement. Furthermore, splitters 11 and 18 can now be provided on a single stage 3, reducing relative positional errors and facilitating-alignment. For the interferometrc setup, the guiding stage 21 is no longer used. Instead of the perfectly circular shape of the cross-section of the reflective member 2, in FIG. 3 a regular polyedric shape is used, allowing a relative flat reflection surface for measurement beams 13 and 14. Here the beam is not divergently reflected on the reflective measurement surface 7 but travels directly back to the beam splitters 11 and respective reflective mirrors 15 and 16.

Figure 4:
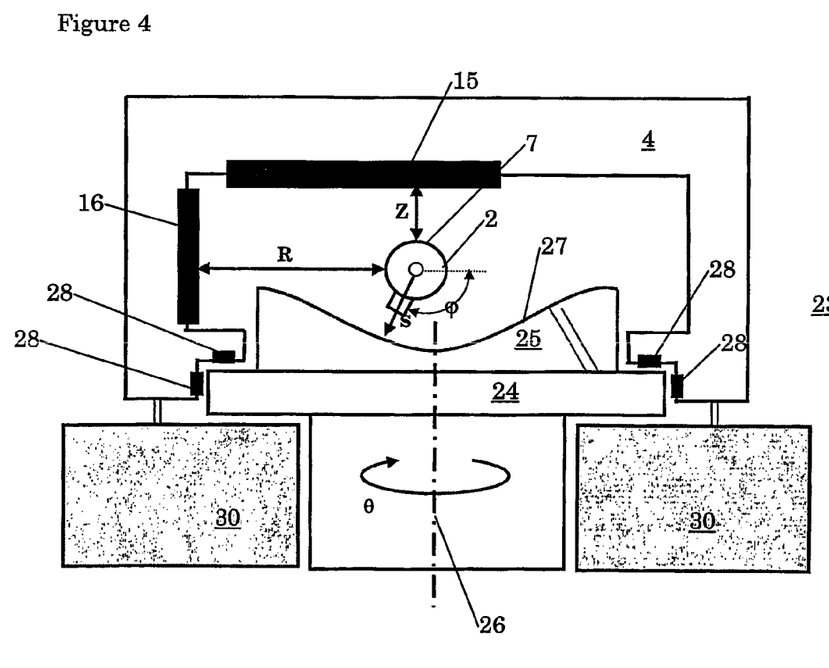
FIG. 4 shows a general setup for the apparatus according to the invention.
Figure 5:
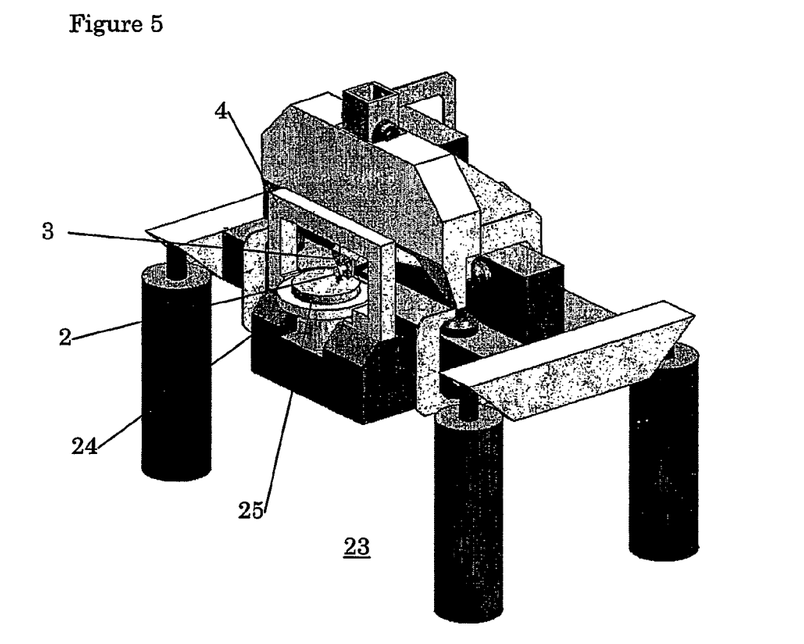
FIG. 5 shows a perspective schematized view of the apparatus according to the invention.

FIG. 4 and FIG. 5 show a general schematic view in cross-section and a perspective view of a surface contour measuring apparatus 23. Said measuring apparatus comprises a rotatable spindle 24 for mounting an element to be measured 25 (schematically referenced by the circular $\theta$ arrow). The element to be measured 25 may be an optical-element such as a lens or aspheric optical element. In this respect the term aspheric indicates an element that may be rotationally symmetric along rotation axis 26 of the spindle 24 but that deviates from a spherical form along radial contour indicated by reference 27. However, the aspheric element 25 may be not rotationally symmetric as well as will be explained in further below. Above said rotating spindle 24 a contour scanning distance sensor 2 is present and is rotatable, schematically indicated by the rotation angle $\phi$. The distance sensor 2 measures a distance s relative to a selected position on a surface of an element 25 mounted on said spindle 24. Schematically indicated by (preferably contactless) measuring/reference elements 28, the position of the spindle 24 is measured relative to measurement frame 4. In addition, the radial offset of the spindle is measured. To also detect tilt of the element 25 relative to said spindle 24, said spindle 24 comprises a further reference surface (not shown). In this way, the measurement loop is closed, linking every-position on the element 25 directly to the measurement frame 4 so that the relative position of the element 25 towards said measurement frame 4 is known. As such measuring/reference alignment is known in the art, this will not be further elaborated upon. The angle $\phi$ of rotation of the distance sensor 2 is known by a rotation measurement device, in FIG. 1-FIG. 3 schematically-indicated by reference 29.

From FIG. 4 follows, that all measured positions are known relative to a measurement frame 4. By the apparatus 1 according to the invention, the surface contour of element 25 can be derived without introducing Abbe errors due to alignment, since one is able to measuring the position of the rotatable distance sensor 2 by measuring directly on a measurement surface 7 provided on said rotatable distance sensor 2. In order to further eliminate measurement errors, the apparatus 1 is mounted on shock absorbing pillars 30 providing a relative vibration free measurement environment.

Figure 6:
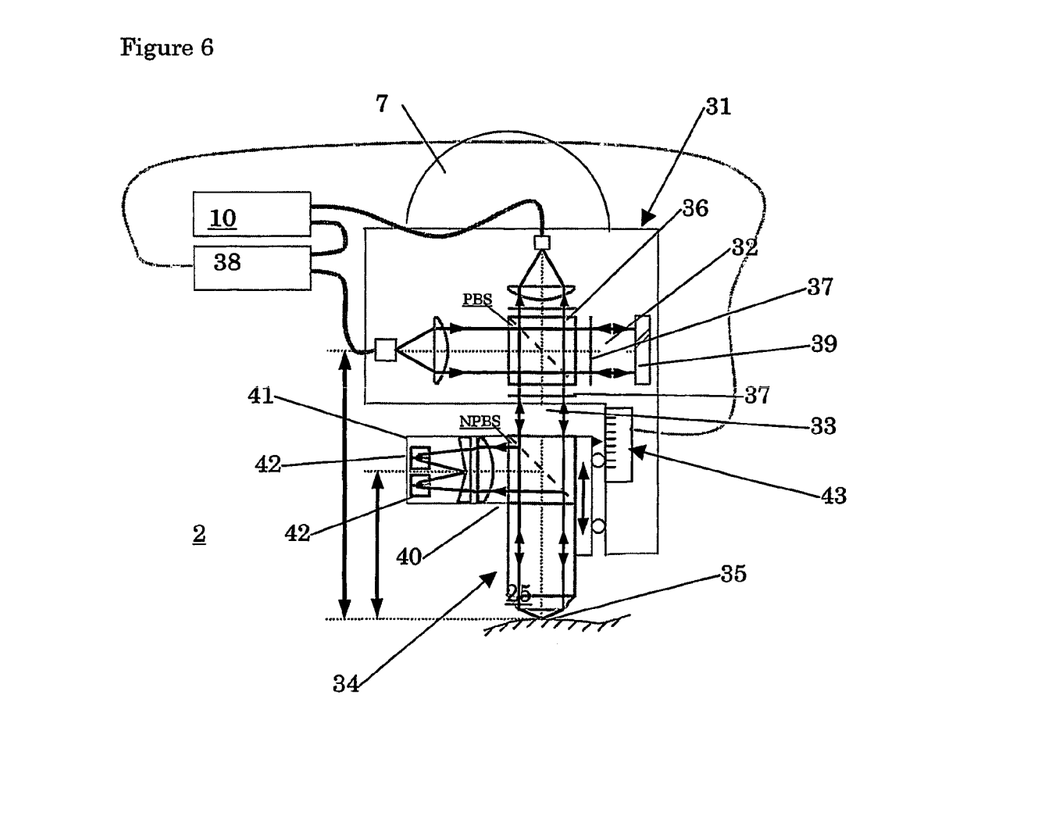
FIG. 6 shows a preferred embodiment of a contour scanning distance sensor.

FIG. 6 shows a preferred embodiment for the surface contour scanning sensor 2. The sensor comprises a two part arrangement, having an (heterodyne) interferometric part 31 for performing an actually measured optical path difference between a reference leg 32 and an measurement leg 33; and an auto focus part 34 as will explained further below.

The measurement leg 33 travels through the autofocus part 34 and is reflected back on a scanning surface 35 that is part of an element to be measured. The measured optical path difference from the measurement leg 33 relative to the reference leg 32 in the interferometric part 31 provides (sub) nanometer precision of the displacement of scanned surface 35 to a reference position fixed to interferometric part 31. The core of the interferometric arrangement 31 is essentially formed by polarizing beam splitter 36, which is provided with quarter lambda plates 37 to provide a desired beam path for the measurement beam 33 and reference beam 32. The interferometric measurement is essentially performed by an arrangement formed by the laser 10 (which may be the same or a different laser used in the distance measurement arrangement depicted in the previous figures), interferometric detector 38, polarizing beam splitter 36, reference surface 39 and scanned surface 35.

Figure 7:
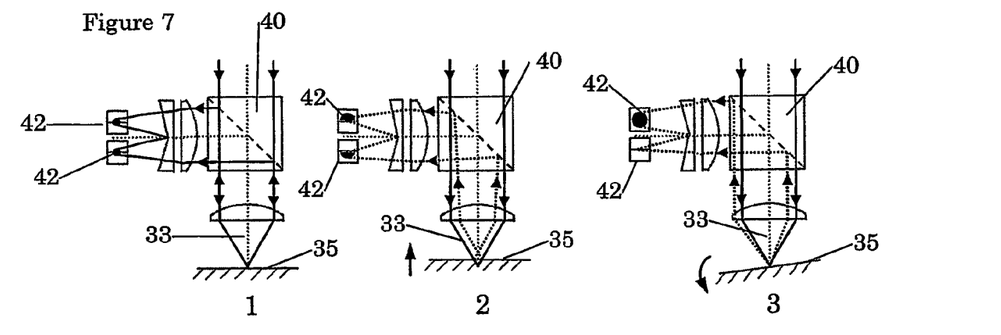
FIG. 7 shows a typical use of the auto focus element in the contour scanning distance sensor of FIG. 6.

To keep the scanning beam 33 in focus, auto focus arrangement 34 is provided in the measurement leg 33 for focusing the scanning beam 33 on a selected position on surface 35 of element 25. To this end the auto focus arrangement 34 comprises a (non polarizing) beam splitter 40 that channels a portion of the reflected scanning beam 33 towards a detector unit 41. The detector unit 41 detects a difference in balance and/or position of a pair of focus spots 42, to measure a tilt and/or in focus of the scanning beam. FIG. 7 shows the effects of such in focus and/or tilt in positions: (1) shows a scanned surface 35 in focus of the scanning beam 33 and having a level position, wherein two detector spots 42 are centred; (2) shows the scanned surface 35 out of focus, where the two detector spots 42 are still balanced but off-centre; (3) shows the scanned surface 35 tilted; where an imbalance is detected between the detector spots 42. In FIG. 7, the reflected signal is depicted in dotted lines.

The inclination of the scanned surface 35 may be measured via said tilt detection. Said inclination may also be measured in more directions using generalized versions of this setup having more than two detector spots 42.

Otherwise, as indicated with reference to FIG. 4, the inclination of the surface 35 may only be measured in the tangential direction of the rotating spindle 24, since the radial inclination is (indirectly) measured using the interferometric device 2. The interferometric distance sensor 2 having autofocus offers an absolute distance measurement in addition to the (relative) interferometric measurement. In other words, using the interferometric detection, a relative displacement is measured through a measured optical path difference in reference leg 32 and measurement leg 33. This establishes a measured contour that has a non-fixed zero level. To this end, the auto focus arrangement 34 comprises a focus distance measurement device 43 in order to measure a focal distance from said auto-focus detector the scanned surface 38 of element 30. This device may be a capacitive distance meter or an inductive distance meter. Alternatively a glass-lineal may be used to provide an absolute distance relative to the measurement surface 7/measurement frame 4. The device 2 as illustrated is therefore able to establish absolute distance measurement within the accuracy of the auto focus arrangement 34 with focus distance measurement device 43; and relative distance measurement within the resolution of the interferometric arrangement 31. It may be clear that the contour scanning sensor as illustrated may be used also in non-rotatable configurations.

Figure 8:
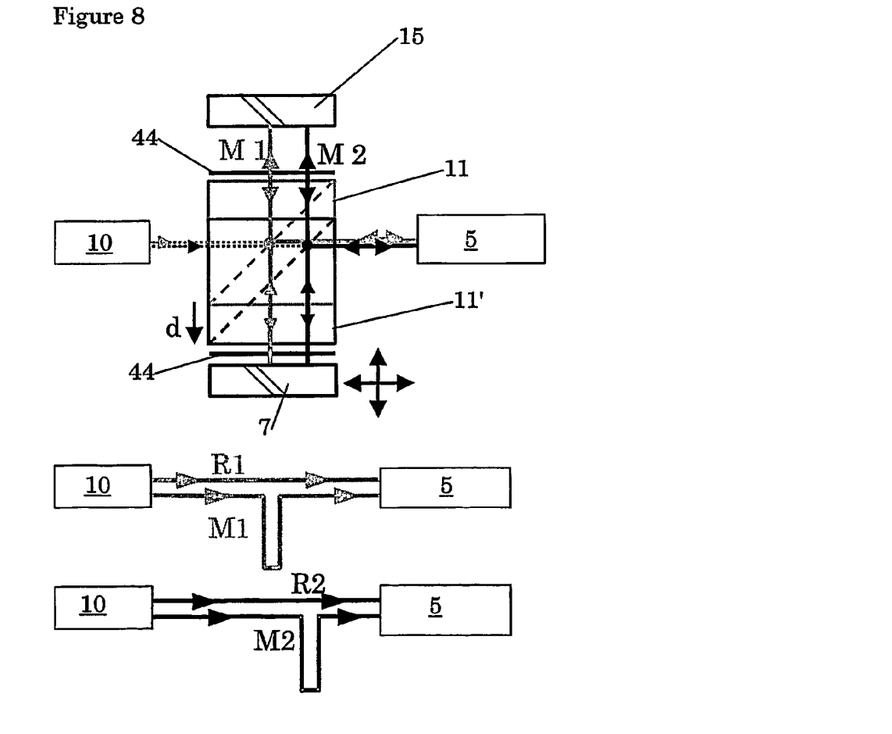
FIG. 8 shows a ray analysis of a preferred interferometric setup for a distance measurement apparatus according to the invention.

FIG. 8 shows the relative insensitivity of (small) displacements of a beam splitting element 11 depicted in FIG. 1-FIG. 3. In the figure, beam splitting element 11 is shifted over a distance indicated by d. The beam path for the unshifted splitting element 11 is depicted in grey line as measurement beam M1 and reference beam R1; the beam path for the shifted splitting element is depicted in black lines as measurement beam M2 and reference beam R2. The beams R1, M1 (and shifted beams R2, N2 respectively) are polarized beams relatively orthogonal to each other and transmitted by the heterodyne laser 10. The R1, M1 beams interfere after rotating the polarization in a beat signal, that is slightly shifted by Doppler effects caused by relative variations between the two beams. The arrangement is such that the reference beam R1 is transmitted unhindered by the beam splitter 11 towards the detector 5. Measurement beam M1 is however, due to its orthogonal polarization state relative to R1, reflected by the polarizing beam splitter 11 towards reference mirror 15. Towards and from said reference mirror 15 it passes twice a quarter lambda plate 44 which effectively results in 90° relative rotation of the polarization, so that, on entrance of the polarizing beam splitter 11, beam M1 has now the same polarization state as R1 and is transmitted unhindered by the beam splitter 11 towards the measurement surface 7. On its way towards surface 7 it passes again a quarter lambda plate 44, which is also passed on the way back. Such double crossing of plate 44 results in another 90° shift of the polarization, resulting in reflection by the beam splitter 11 towards detector 5. In FIG. 8 it is illustrated how the measurement beam M1 and reference beam R1 are shifted after a small displacement of the beam splitter. It shows that the optical path difference between the reference beam (R1, R2) and measurement beam (M1, M2) is unaffected by said shift resulting in an unaffected measurement of the distance (variations) between the reference mirror 15 and the measurement surface 7. It follows that the light guidance arrangement as depicted in FIG. 1-FIG. 3 does not add errors in position detection, since the position of the light guidance elements 11 is relatively unimportant.

Although the invention has been illustrated with reference to certain preferred embodiments, the invention is not limited thereto but may enclose variations and modifications without departing from the scope of the invention. Such variations are deemed to fall within the scope of the annexed claims.

The invention claimed is:

1. A surface measuring apparatus for measuring a position on a surface of an element to be mounted thereon, comprising:

a measurement frame comprising a mount for mounting an element to be measured;

a stage comprising a rotatable device, said stage being movable in at least a first direction relative to said measurement frame; and a contactless distance measurement device for measuring in said first direction a distance between said measurement frame and a predetermined measurement surface provided on said rotatable device, said rotatable device further comprising:

a second distance measurement device, for measuring in a second direction a second distance between said device and a selected position on a surface of an element mounted relative to said measurement frame; and a rotation measurement device for measuring an angle of rotation between said first and second direction, wherein at least said first distance measurement device comprises an interferometer and said measurement surface is formed by a reflective member that has a polyhedral or circular shape over at least said measurement surface, and said reflective member is comprised in a housing provided on said stage, and wherein said reflective member is coupled directly to said second distance measurement device, said housing comprising a focusing member for focusing light from said first distance measurement device on said reflective member, so that a reflective light beam emanates virtually from the central axis of said reflective member.

2. Apparatus according to claim 1, wherein said measurement surface is rotation invariant.

3. Apparatus according to claim 1, wherein said focusing member is a cylindrical lens and said reflective member is cylindrical or wherein said focusing member is a spherical lens and said, reflective member is spherical.

4. Apparatus according to claim 1, wherein said measurement frame comprises a reflective mirror, and wherein said stage comprises a beam splitting element, wherein a beam path of said first distance measurement interferometer travels directly between said reflective mirror, said beam splitting element and said reflective member, wherein said beam splitting element is coupled a light source, said beam splitting element further coupled to an interferometric light detector.

5. Apparatus according to claim 1, wherein said stage is movable in two orthogonal directions and said stage comprises a third distance measurement device for measuring in a third direction a third distance between said stage and said measurement frame, said third direction being orthogonal to said first direction.

6. Apparatus according to claim 1, further comprising a rotatable mount for mounting said element to be measured.

7. Apparatus according to claim 6, wherein said mount comprises a reference surface for allowing a measurement relative to said measurement frame.

8. Apparatus according to claim 1, wherein said second distance measurement apparatus comprises:

an interferometric part for providing an interferometric measurement beam;

a movable focus part for focusing said interferometric beam on a selected position on said surface of said element;

an interferometric detector for receiving said interferometric beam from said selected position and for measuring a distance between said interferometric part and said selected position;

a unit for automatically moving said focus part to an in-focus position; and a focus distance measurement device for measuring a relative position between said focus part and said interferometric part.

9. Apparatus according to claim 8, wherein said focus distance measurement device comprises an inductiveand/or capacitive distance meter or a glass lineal.

10. Apparatus according to claim 8, wherein said focus distance measurement device is coupled to said interferometric detector in order to provide an absolute zero-level to an interferometric measurement performed by said detector.

11. Apparatus according to claim 9, wherein said focus distance measurement device comprises a distance meter for measuring a relative distance of the interferometer relative to the auto focus.

12. Apparatus according to claim 8, wherein said second distance measurement interferometer comprises a tilt detector for detecting a level of tilt of said element to be measured.

13. Apparatus according to claim 12, wherein said tilt detector is arranged to detect a level of tilt of the element to be measured in a direction orthogonal to said first and second directions.

14. Apparatus according to claim 12, wherein said tilt detector is coupled to said stage, so as to position said second distance measurement device orthogonally to a measured contour of said element.

15. Method for measuring a position on a surface of an element, comprising:

providing a measurement frame;

providing a stage movable relative to the frame and comprising a device that is rotatable relative to said stage;

providing a predetermined measurement surface on said rotatable device;

measuring directly in a first direction a first distance between said measurement frame and said predetermined measurement surface provided on said rotatable device;

measuring in a second direction a second distance between said rotatable device and a selected position on a surface of an element mounted relative to said measurement frame; and measuring an angle of rotation between said first and second direction, wherein said measuring directly in said first direction is performed by at least a first distance measurement device comprising an interferometer and said predetermined measurement surface is formed by a reflective member that has a polyhedral or circular shape over at least said measurement surface, said reflective member is comprised in a housing provided on said stage, and wherein said reflective member is coupled directly to a second distance measurement device, said housing comprising a focusing member for focusing light from said first distance measurement device on said reflective member, so that a reflective light beam emanates virtually from the central axis of said reflective member.

16. Apparatus according to claim 9, wherein said second distance measurement interferometer comprises a tilt detector for detecting a level of tilt of said element to be measured.

17. Apparatus according to claim 13, wherein said tilt detector is coupled to said stage, so as to position said second distance measurement device orthogonally to a measured contour of said element.

* * * * *

UNITED STATES PATENT AND TRADEMARK OFFICE
CERTIFICATE OF CORRECTION

PATENT NO.        : 7,492,468 B2
APPLICATION NO.   : 10/573763
DATED             : February 17, 2009
INVENTOR(S)       : Rens Henselmans et al.

Page 1 of 1

It is certified that error appears in the above-identified patent and that said Letters Patent is hereby corrected as shown below:

On the title page, please amend item (73) to read as follows:

--(73) Assignee: Nederlandse Organisatie Voor Toegepast-Natuurwetenschappelijk Onderzoek TNO, VK Delft (NL)--.

Signed and Sealed this

Tenth Day of November, 2009

David J. Kappos
*Director of the United States Patent and Trademark Office*